United States Patent [19]
Lyon

[11] 3,947,845
[45] Mar. 30, 1976

[54] ALTITUDE CODING FOR COLLISION AVOIDANCE SYSTEM

[75] Inventor: John Jeffrey Lyon, Canoga Park, Calif.

[73] Assignee: RCA Corporation, New York, N.Y.

[22] Filed: Apr. 19, 1974

[21] Appl. No.: 462,491

[52] U.S. Cl. ............... 343/6.5 LC; 343/112 CA
[51] Int. Cl.² ......................................... G01S 9/56
[58] Field of Search ...... 343/6.5 R, 6.5 LC, 112 CA

[56] References Cited
UNITED STATES PATENTS

| | | | |
|---|---|---|---|
| 3,603,993 | 9/1971 | Follen et al. | 343/6.5 LC |
| 3,750,168 | 7/1973 | Schrader et al. | 343/112 CA X |
| 3,766,552 | 10/1973 | Hajduk | 343/112 CA X |
| 3,808,598 | 4/1974 | Carter | 343/112 CA X |
| 3,849,782 | 11/1974 | Bond | 343/112 CA |

*Primary Examiner*—T. H. Tubbesing
*Attorney, Agent, or Firm*—Edward J. Norton; Joseph D. Lazar

[57] ABSTRACT

In a cooperative collision avoidance system for aircraft, an altitude encoding system serves as a discriminant to insure orderly sequence of data exchange between cooperative aircraft, particularly, in a dense traffic environment. The system includes means for generating pairs of pulse-interval coded signals spaced to represent altitude addresses from interrogator to responder aircraft. Responder aircraft reply with a single pulse to such an altitude address only if the responder aircraft is at the altitude corresponding to the address.

8 Claims, 11 Drawing Figures

PROBE ENCODER (28 OF FIG. 1)

ALTITUDE DECODER (42 OF FIG. 2)

| | ALTITUDE LAYERS PROBED | | |
|---|---|---|---|
| | CLIMBING | LEVEL FLIGHT | DESCENDING |
| 7500' | X | | |
| 7000' | X | | |
| 6500' | X | X | |
| 6000' | X | X | |
| 5500' | X | X | X |
| 5000' | X | X | X |
| 4500' | X | X | X |
| OWN AIRCRAFT PROBE CODE → 4000' | X | X | X |
| 3500' | X | X | X |
| 3000' | X | X | X |
| 2500' | | X | X |
| 2000' | | X | X |
| 1500' | | | X |
| 1000' | | | X |

FIG. 7

| | ALTITUDE LAYERS PROBED | | | | |
|---|---|---|---|---|---|
| | CLIMBING | | LEVEL FLIGHT | DESCENDING | |
| | 16,000' TO 16,900' | 17,000' TO 17,900' | | 16,000' TO 16,900' | 17,000' TO 17,900' |
| 21,000' | | X | | | |
| 20,000' | | X | | | |
| 19,000' | X | X | X | | X |
| 18,000' | X | X | X | | X |
| 17,000' | X | X | X | X | X |
| OWN AIRCRAFT PROBE CODE → 16,000' | X | | X | X | X |
| 15,000' | X | | X | X | X |
| 14,000' | | | | X | |
| 13,000' | | | | X | |
| 12,000' | | | | | |
| 11,000' | | | | | |

ALTITUDE CODING FOR COLLISION AVOIDANCE SYSTEM

CROSS REFERENCE OF RELATED APPLICATIONS

Of interest are the following copending applications: Ser. No. 269,536, filed July 7, 1972, entitled "Digital Tracker," based on the invention of Bernard Case now U.S. Pat. No. 3,803,604, issued Apr. 9, 1974; Ser. No. 269,535, entitled "Digital Range Rate Computer,", now U.S. Pat. 3,803,602, issued Apr. 9, 1974 Ser. No. 269,538, entitled, "A Track Gate Movement Limiter," both based on the inventions of Bernard Case and Jeffrey Ellis Miller, and Ser. No. 269,537, entitled "Asynchronous Pulse Receiver,", now U.S. Pat. 3,848,191, issued Nov. 12, 1974 based on the invention of L. H. Anderson, all filed respectively on July 7, 1972; Ser. No. 355,448, entitled "Correlator and Control System for Vehicular Collision Avoidance," filed Apr. 30, 1973, now U.S. Pat. 3,887,916, issued June 3, 1975 based on the invention of Ronald Bruce Goyer, and all assigned to the same assignee of the present invention.

BACKGROUND OF THE INVENTION

1. Field of the Invention

The present invention relates to a control circuit for a vehicle to process signals useful in a vehicular collision avoidance system, more particularly, of the SECANT type for aircraft.

2. Description of the Prior Art

The present invention is concerned with improvements to and extensions of the signalling system disclosed and claimed in the above-identified copending patent applications relating to the basic principles of SECANT, which is a signalling system for avoiding midair collision between aircraft.

A detailed description of the basic principles of SECANT are disclosed in U.S. Pat. No. 3,755,811, issued Aug. 18, 1973, entitled "Discriminating Signalling System" and U.S. Pat. No. 3,803,608, issued Apr. 9, 1974, entitled "Separation Control of Aircraft by Non-Synchronous Techniques," both based on the inventions of Jack Breckman, assigned to the common assignee as the present application.

In air traffic control systems, it is advantageous if not essential to provide a means of determining the relative if not the absolute altitudes of aircraft in the vicinity of each respective aircraft. Various techniques are known for providing such altitude information as by the use of converting barametric altimeter or radar altimeter information into appropriate signals for transmission to cooperative aircraft and ground stations and for comparing comparable altitude information from remote aircraft and ground stations.

The problems concerning the determination of such altitude information becomes increasingly more acute as the speed of cooperative aircraft increases and the density of traffic caused by cooperative aircraft increases. The SECANT system described in detail in the above patents and copending applications is based on a statistical correlation of an exchange of interrogation and reply signals that provides a means for determining range and tau (the ratio of range to range rate which is an indication of possible or potential time to collision) between the cooperating aircraft. The SECANT system utilizes two basic discriminants to achieve a high order of accurate correlation with a minimum chance of statistical error. The discriminants are based on the concept of frequency hopping and frequency jitter. Frequency hopping is achieved by providing a plurality of different signal frequencies for transmitting and receiving signals between the aircraft. Frequency jitter provides for the discriminant that minimizes the chance of false signals being received in the correlation of the frequency-hopped signals by jitter of the time of transmission relative to a fixed repetition rate of each signal.

In one prior art system as described in U.S. Pat. No. 3,603,993, issued Sept. 7, 1971, entitled "Control Apparatus," and assigned to Honeywell, Inc., for developing altitude information signals, there is provided means that utilizes a pulse position encoder wherein a first pulse is transmitted at a given time followed by a second pulse which is positioned relative to the first pulse proportional to the exact altitude of the encoding aircraft based on an altitude sensor. Such a sensor may be a barometric type or a radar type of sensor for absolute altitude. In such a system the means for positioning the second pulse, or to position the pair of pulses by techniques known as pulse position modulation (PPM), analog techniques in some portion of the control circuitry is required in order to develop a signal that is proportional to the exact altitude. Such a procedure requires instruments that are extremely sensitive to altitude variations and, in addition, some form of analog to digital conversion is required if the signal processing circuits are in digital form.

SUMMARY OF THE INVENTION

According to the present invention, a control system is provided for exchanging data between aircraft. A pair of pulses are transmitted on a regular basis but time-shifted in random amounts from an interrogating aircraft seeking replies from aircraft in the vicinity of the altitude of interrogating aircraft or from aircraft whose altitude is within a predetermined altitude layer. The interval between each pulse of the pair of interrogating pulses is a predetermined value plus a variable interval defined in fixed or discrete intervals of a finite value in steps corresponding to predetermined bands of altitude.

BRIEF DESCRIPTION OF A PREFERRED EMBODIMENT

Figure 1:
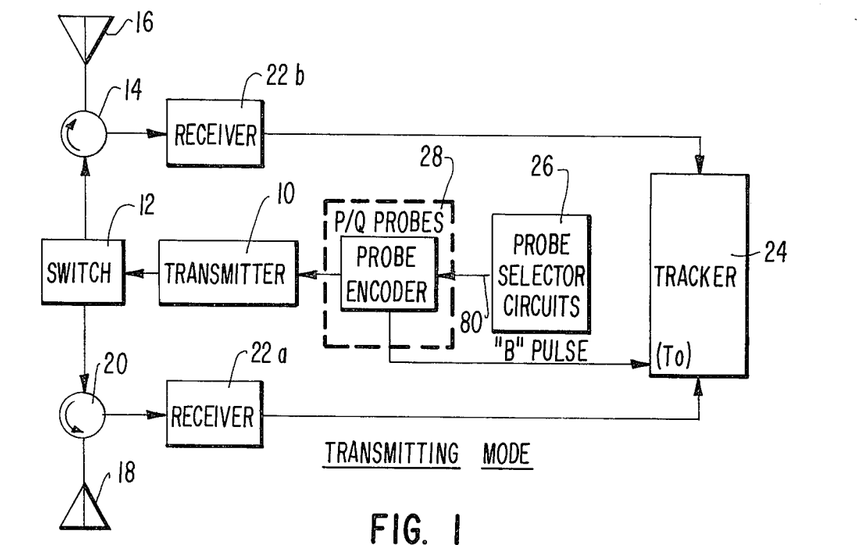
FIG. 1 is a functional block diagram of the altitude coding functions as provided on the transmitting aircraft according to the invention.

According to the invention, in order to exchange data between two or more aircraft in a high traffic environment, the transmitting ("interrogating") aircraft should be able to interrogate only those aircraft of interest in terms of their relative altitude regardless of the relative direction of travel. In order to achieve this manner of discrete interrogation, signals probes from the transmitting (interrogating) aircraft are "addressed" such that only the receiving aircraft whose "address" corresponds to that being transmitted may or should reply. One form of collision avoidance system known as SECANT includes as a criteria for addressing the respective aircraft the relative altitude information. According to this invention, this altitude information is defined by the interval between two pulses. A minimum spacing of the pulses is utilized being a predetermined value of 34 microseconds. Reference is now made to FIG. 1 wherein a functional block diagram illustrating the transmitting portion of the system is shown. A transmitter 10 through a suitable switch 12 is arranged (in the mode shown) for transmitting an interrogation signal through a three port circulator 14 to an upper antenna 16 for transmission to surrounding aircraft. Reply signals from these aircraft are received over upper antenna 16 through circulator 14 through a receiver 22b, of the type described in the patent application, Ser. NO. 269,537, now U.S. Pat. 3,848,191, for the pulse receiver, for processing by a tracker 24 of the type described in the above-identified copending tracker applications. A random probe selector circuit 26 provides a signal for encoding by the encoder 28 for transmission over the transmitter 10. The random probe selector 26 may be of the type also described in the above cited patents and copending applications. Similarly when an interrogating signal is transmitted through the lower antenna a different set of frequencies related to the replies are received on the lower antenna 18, circulator 20, and receiver 22a as the receiving channel for processing by the tracker.

Figure 2:
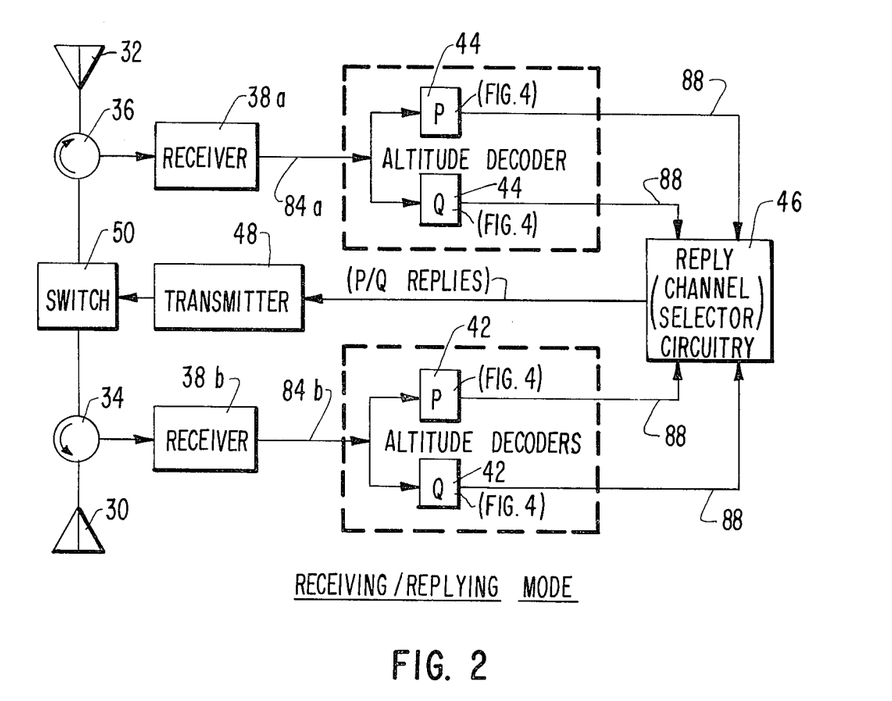
FIG. 2 is a functional block diagram of the altitude decoding functions of the receiving aircraft according to the invention.

Interrogating signals that are received by remote aircraft are processed in the decoding portion of the system as illustrated in FIG. 2. Signals are received over antennae 30 and 32 and coupled to circulators 34 and 36 to a pair of receivers 38a and 38b for decoding in decoders 42 and 44. The decoder provides signals to a reply channel selector 46 for transmitting the reply signal required back to the interrogating aircraft by transmitter 48 and depending upon the position of switch 50 through upper antenna 32 or lower antenna 30.

The system is arranged to be switched from transmitting to receiving modes by switch 12 or 50, depending on the condition of the signals. Receiving modes are arranged to preempt transmitting modes in the SECANT system. The transmitting or interrogating function as illustrated in FIG. 1 represents a system in practice wherein a pair of antennae are provided on each aircraft for scanning the environment in an upper and lower scan to thereby provide a discriminant of cooperative aircraft replying to interrogation signals which are thereby identified to be above or below the interrogating aircraft.

Figure 3:
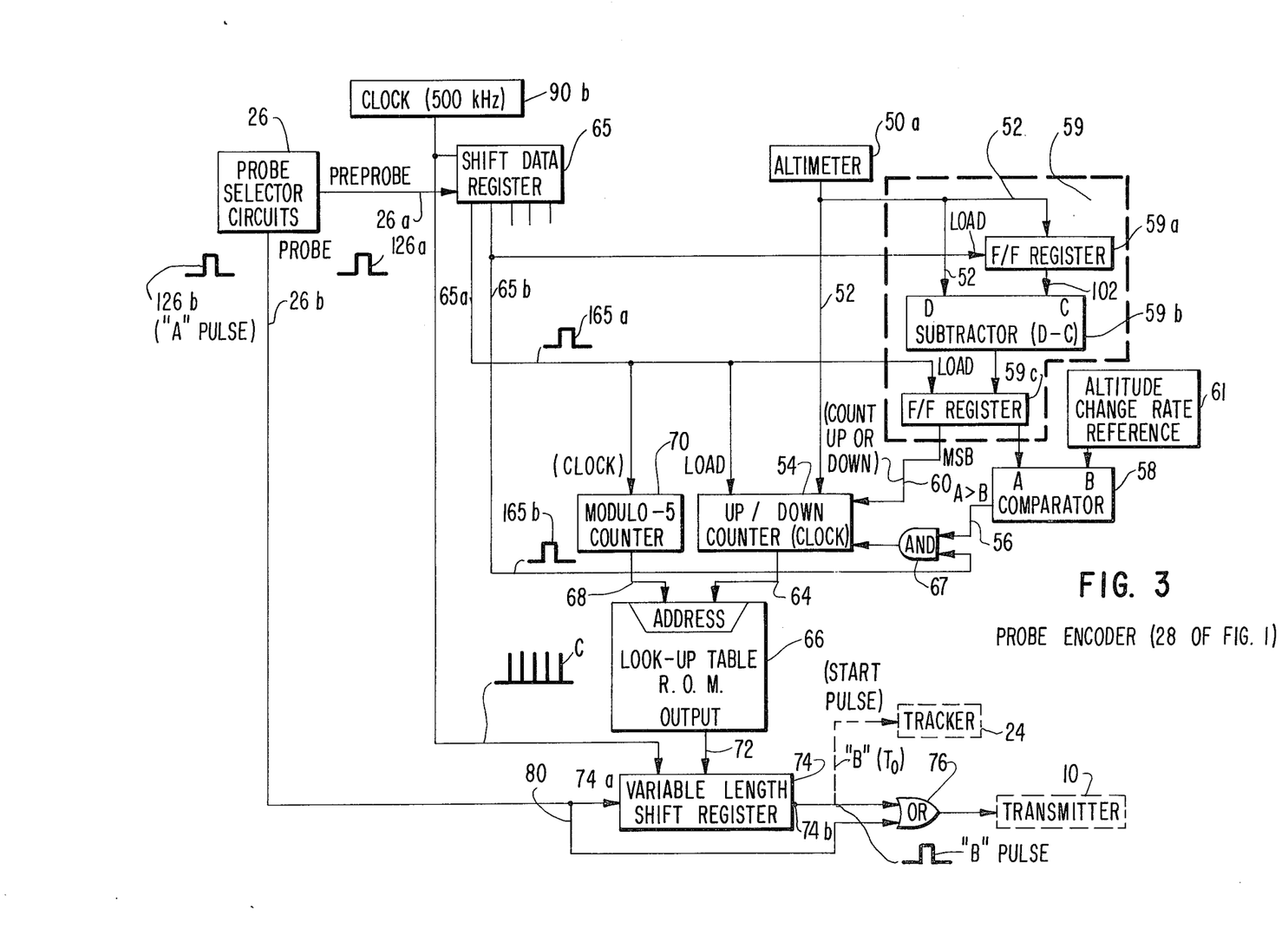
FIG. 3 is a block diagram of the altitude encoder in more detail.
Figure 4:
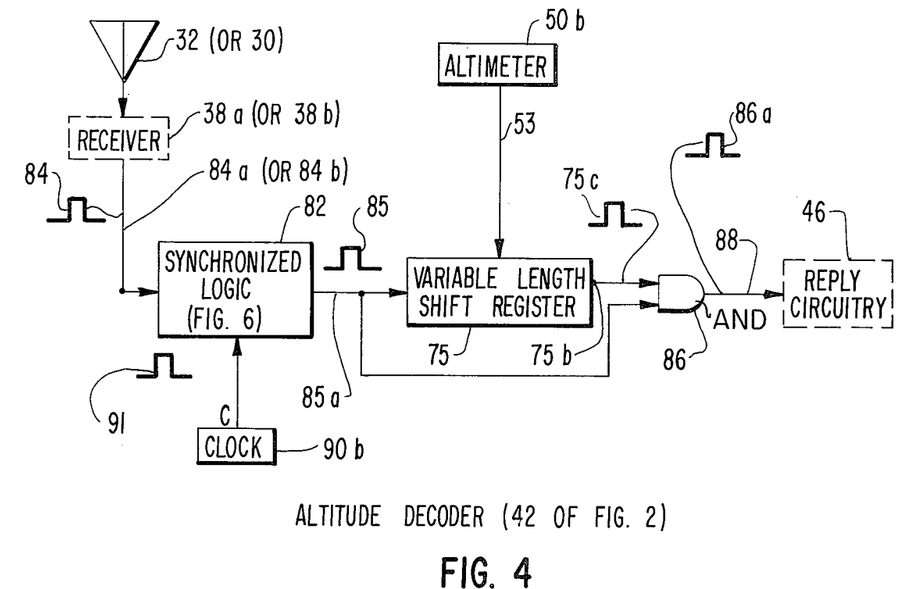
FIG. 4 is a block diagram of the altitude decoder in more detail.

Reference is now made to FIGS. 3 and 4 wherein the probe encoder 28 of FIG. 1 and either of the altitude decoders 42 and 44 of FIG. 2 are illustrated in block diagram form.

The probe encoder 28 includes an altimeter 50a providing the barametric altitude of the aircraft in binary form. The output signals of altitude are coupled over path 52 to an up/down counter 54 receiving additional signals to modify the actual altitude by any changes that may be occurring as indicated by a suitable rate of climb/or descent device. These signals are determined according to the present invention by a computer device 59 formed of F/F registers 59a and 59c and a subtractor 59b.

Figure 9A:
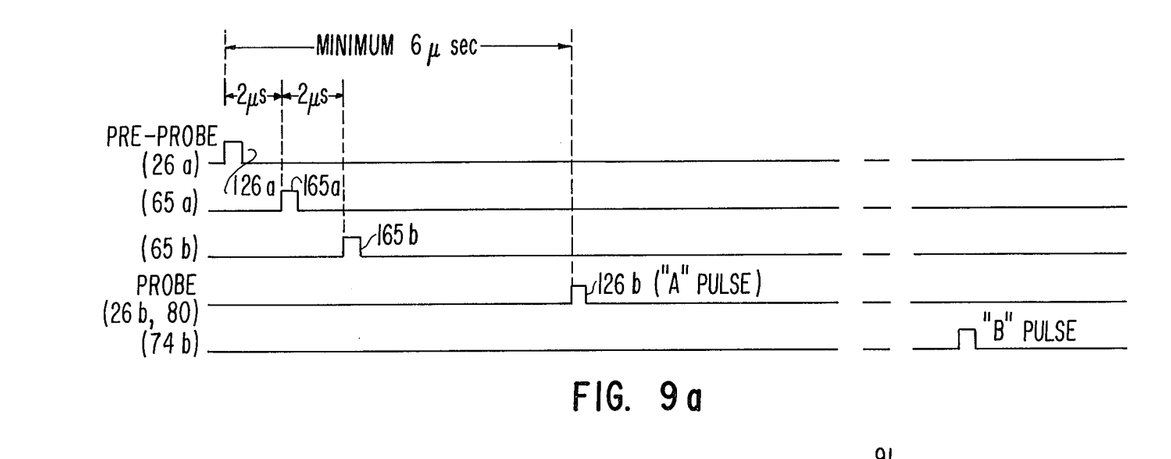
FIGS. 9a, 9b, and 9c are wave form diagrams illustrating the relative time sequences of the control and coded signals.

Probe selector circuits 26 are suitably provided with a preprobe timing pulse 126a prior to probe signals over path 26a to gate a suitable delay such as a shift register 65 having a first output pulse 165a delayed 2μs following the preprobe signal 26b and a second output pulse 165b. The probe signal 126b, which is the first pulse (pulse "A") of the pair of altitude probe pulses according to the invention, is provided over path 26b to a variable length shift register 74. A minimum of 6μs is provided before pulse 126b so that the system is stabilized. See FIG. 9a for a timing chart illustrating the relative sequences of these pulses.

Register 59c is loaded by the rate of altitude change from subtractor 59b in response to pulse 165a, which pulse also provides the altitude load signal for counter 54 and clocks a modulo-5 counter 70 to its next state. Pulse 165b is applied to an AND gate 67 and also provides the load control for register 59a to receive altitude data from altimeter 50a. If the rate of altitude change from register 59c exceeds the value of a reference 61, as determined by comparator 58, then AND gate 67 is enabled and pulse 165b will clock counter 54 in the direction determined by path 60 from the most significant bit (MSB) of register 59c, which represents the direction of altitude change. A logic zero, for example may be used to indicate that altitude data on path 52 is greater than the previous altitude data stored in register 59a, and, that therefore, an altitude change occurred to a higher altitude. Thus, counter 54 is arranged to count up. Also, if the condition on path 60 is a logic one, then the altitude changes manifests a lower altitude and the counter 54 counts down.

The output of subtractor 59b represents the rate of altitude change, "rate" being "distance" divided by "time." Subtractor 59b determines the difference in altitude ("distance") between data on path 52 and the output of register 59a on path 102, which is the altitude at the time of the last pulse 165b, which is the "time" interval between pulses 165b. Any suitable time sequence may be used. Here the time delay is 2μs. However, a delay of as much as one minute may be adequate for some purposes, the delay being suitably provided as desired. The output of counters 70 and 54 on path 68 and 64 represent a combined address to ROM 66. ROM 66 on path 72 provides a binary word to register 74 to select the clock periods C of delay between input 74a and output 74b. This delay represents the delay between the pulse pair (pulses A and B) for the interrogation or probe address. Thus, as the altitudes change to higher or lower altitudes, then the counter 54 functions to count up or count down accordingly. The output of variable length shift register 74 is coupled through OR gate 76 to the transmitter 10 with the probe request signal 126b from selector circuit 26 received over path 80, which, as shown, is also coupled to the second input of OR gate 76. The output of shift register 74, the second pulse, pulse "B" of the coded altitude probe pulses, is also coupled to the tracker 24 for the start of the range measurement as the start pulse ($T_o$) shown in the copending application, Ser. No. 269,536 for a "Digital Tracker, now U.S. Pat. No. 3,803,604.

Referring now to FIG. 4, a decoder which represents either of the P or the Q portions of the decoders 42 or 44 shown in FIG. 2 on the replying aircraft is arranged to receive a signal from its altimeter 50b over a path 53 carrying binary altitude information to a variable length shift register 75. An incoming probe or interrogation signal (P or Q) is received from antenna 32 to its associated receiver 38a whose output pulse 84 is coupled over path 84a for the upper receiving channel (FIG. 2) and path 84b for the lower receiving channel through a logic circuit 82, the output pulse 85 from which is in turn coupled over path 85a and also through an AND gate 86. The output pulse 86a from AND gate 86 is coupled over path 88 to channel selection reply circuitry 46. Clock 90b provides clock pulses 91 to logic 82 as will be described in detail hereafter. The reply circuitry serves to conduct the identified P or Q probe signals to provide command signals for transmitting reply signals to the interrogating aircraft. Such circuits are described in detail the above-identified application, Ser. No. 355,448 relating to the SECANT-type correlator now U.S. Pat. 3,887,916. The decoder circuit of the present invention thus serves as a pulse filter in the correlator to inhibit all probe signals unless the altitude address is accepted by the decoder.

It should be understood that FIGS. 1 and 3 illustrate the functional organization of the system for the transmitting or encoding operations of the invention carried by the probing or interrogating aircraft, while FIGS. 2 and 4 illustrate the receiving or decoding operations carried on the replying aircraft. In practice, each aircraft carries all the equipment required to both encode and decode the signals to provide thereby the means to participate in the cooperative SECANT system as described in the cited patents and copending applications, each aircraft operating both as an interrogating as well as a replying aircraft.

Before describing the operation of the coding system, according to the invention, further description of the various components will first be given. The components and circuitry thereof required to provide the various logic and control functions of the encoder (FIG. 3) and decoder (FIG. 4) may be selected from any of the available components known in the art readily available from manufacturers of such devices.

The modulo-5 counter 70 serves the purpose to provide a repeating sequence of a 5-binary address for the look-up table 66. Counter 70 is typically a modulo-m counter, the value for m being a chosen value depending on the system design requirements. There are various known methods of making modulo-m counters all of which require that after attaining the mth binary address, the next address reached is the first address. For example, one method of providing such a counter is to utilize a synchronous reset input four-bit binary counter and decode the binary (M−1), i.e, 4("$0100_2$"). The decoded binary is fed back to the synchronous reset input such that the next state is binary zero ("$0000_2$"). If the counter has a synchronous load input rather than a synchronous reset input, then the parallel data inputs may be grounded and the load input may be used in the place of the reset input. If both the load and reset inputs are asynchronous, then it will be necessary to decode a binary m, i.e., 5 ("$0101_2$") and fed such a decoded binary back to the reset input. Such a procedure causes a momentary transition or glitch through a sixth (m+1) state. However, such a glitch may be eliminated by suitable timing. Various other forms of devices to provide an m-binary address counter will be apparent to those skilled in the art.

The purpose of the look-up table 66 is to provide a read only memory to serve the function of converting the modulo-m counter address and the up/down counter output into a binary word representing the number of discrete delays or intervals that are to be used as a control of the variable length shift register 74. The table 66 may be formed of any of the known read only memories (ROM) which is a matrix array wherein for each input address there is a memory location containing the binary word which is used to control the variable length shift register 66. The memory 66 is a read-only device so that the contents are nonvolatile with power turned on and off. Accordingly, any nonvolatile memory load with the proper stored information may be used.

The address to ROM 66 over path 64 includes altitude data from altimeter 50a which is preloaded into the up/down counter 54. In addition the up/down counter is provided with carry information from comparator 58 which compares the rate of altitude change from device 59. As shown in the diagram of the encoder in FIG. 3, the altimeter 50a in addition to providing the binary altitude data to the up/down counter 54 also provides the altitude data to a flip-flop register 59a and a subtractor 59b over path 52. Flip-flop register 59a is clocked by the load clock signal 165b from shift register 65 as previously described. Flip-flop register 59a provides a control pulse to the subtractor 59b as input C and the subtractor also receives from the altimeter an input D. The subtractor provides the arithmetic calculation of D minus C. The output of the subtractor 59b is applied to a flip-flop register 59c whose output is applied as the A input to comparator 58. The flip-flop register 59c is under control of load clock signal 165a to provide clearance or reloading depending on the condition of subtractor 59b.

In operation, the rate of altitude change by device 59 is achieved as follows. As the altitude output is applied to flip-flop register 59a and subtractor 59b, any changes in altitude will be indicated by the output of the subtractor 59b once per clock signal. The output from subtractor 59b is the altitude change in feet per minute which is loaded to the register 59c. Thus, once per clock period the condition or status of register 59c is unloaded into the comparator 58 as input A.

Rate reference 61 is a suitable presettable coding source to provide a predetermined word of binary inputs to comparator 58 to establish the altitude change rate reference that the actual rate provided to input A is to be compared with. For example, 6 bits of binary data may be used to represent 1,000 or 1,200 feet per minute as the criterion that is to be compared to the actual rate of altitude change.

The variable length shift register 74 is a suitable known shift register of length K where K is the maximum value of incremental delays required. The input address to the shift register 74 determines through selective gating how many altitude intervals of 2μs each are included between the input and output terminals 74a and 74b, respectively. Shift register 74 may be implemented in the form of a tapped delay line of length K with taps spaced two microseconds apart and suitably gated to select a particular tap (74b) in accordance with the length required as indicated by the output from ROM 66. A similar shift register 75 as shift register 74 is duplicated for the receiver portion of the system as illustrated in FIG. 4 to provide as a reply signal the altitude of the replying aircraft as conducted over path 53 (FIG. 4) from the single, common altimeter (50) of the aircraft. Note that for convenience the altimeter is designated 50a for the probing aircraft and 50b for the replying aircraft.

Figure 6:
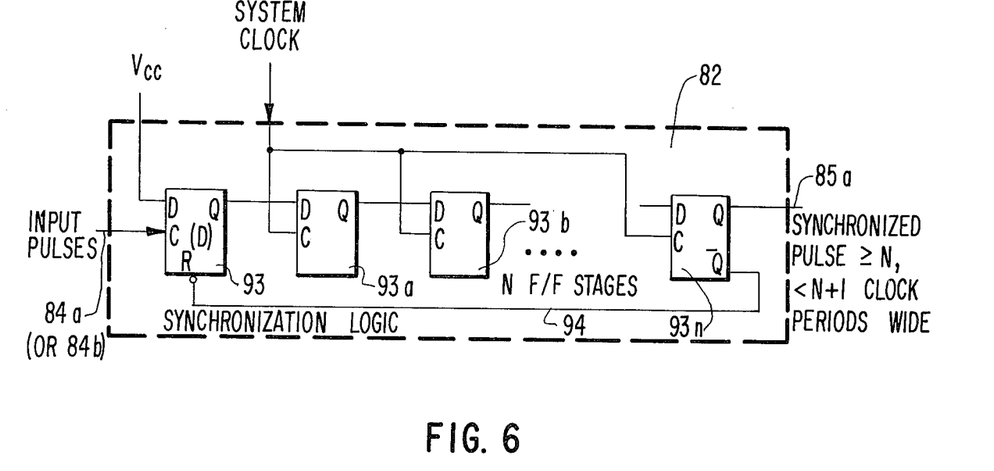
FIG. 6 is a block diagram of the synchronization logic used for block 82 of FIG. 4.

The synchronization logic 82 (FIG. 4) serves to maintain the position of the leading edge of the incoming probe signals 84a (or 84b) while fixing the variable width of the pulse 85 on path 85a to a value greater than or equal to a value of N but less than N + 1 periods of the receiving system's clock 90b. A suitable logic arrangement, as illustrated in FIG. 6, will be described later.

The leading edge of the incoming probe 84 on path 84a or 84b must be maintained and, further, must not be "retimed" otherwise a wider acceptance window than two microseconds (N clock periods) would be required. By not being "retimed" is meant that the incoming probe signals 84 after passing through the synchronization logic 82 (FIG. 6) will not be shifted in accordance with the local clock 90b, but will be maintained in an absolute time sense relative to the probe signal as received through the receiver 38. Any known synchronization circuit functioning as described will be satisfactory but a preferred circuit will be described with reference to FIG. 6 hereafter.

The pulse width of pulse 85 should be maintained between N and N + 1 periods of the clock so that when it is shifted through the variable length shift register 75 (FIG. 4) it will produce an output pulse which is always N clock periods wide. Such a pulse 85 is then used as the "acceptance" window to determine whether the pulse pair spacing was the proper "address" for the receiving system. The synchronization logic 82 is preferably arranged to set a logic level high on the leading edge of the input pulses, and subsequently, N clock periods later, arrange the logic to reset that logic level from high to low.

According to the preferred embodiment being described, the clock 90b provides a clock signal 91 at approximately 500 KHz.

OPERATION OF THE SYSTEM ILLUSTRATED IN FIGS. 3 AND 4

In operation in order to exchange data between two aircraft in a high traffic environment, the transmitting aircraft functioning to provide probes or interrogations must be able to interrogate only those aircraft of interest as indicated above. The binary altitude from the altimeter 50a of the interrogating aircraft is loaded into the up/down counter 54 once per scan of all altitude addresses of interest.

Figure 8:
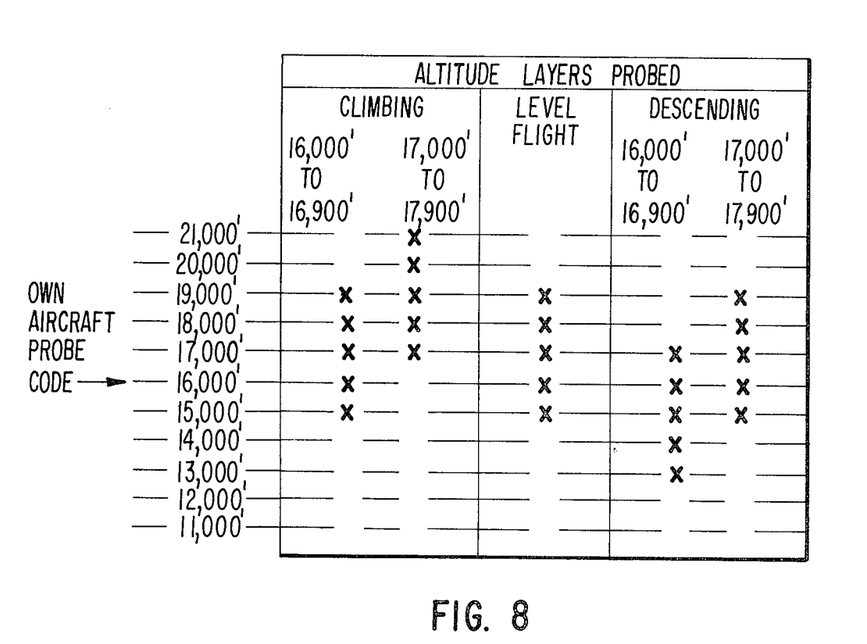
Figure 9B:
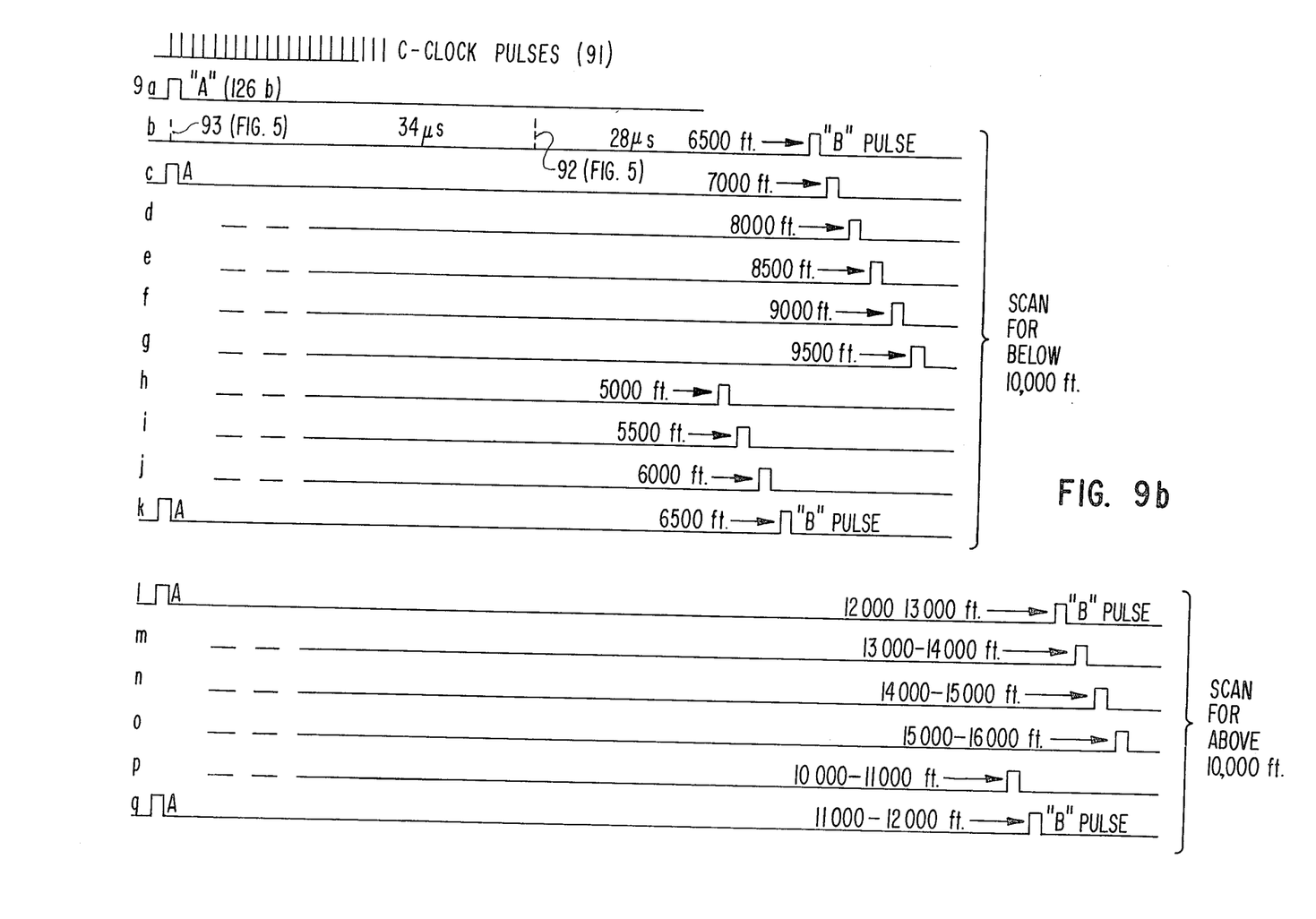
Figure 9C:
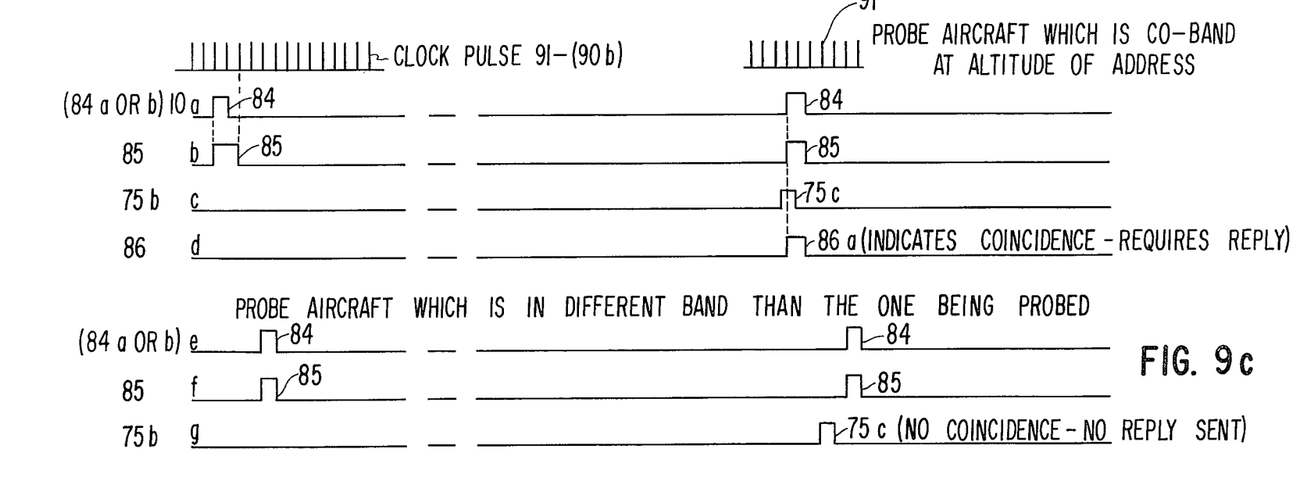

In the description following, reference should be made to the timing diagrams shown in FIGS. 9b and 9c. FIG. 9b illustrates a typical altitude probe scan for an interrogating aircraft at 7,000 feet and one at 12,500 feet. The sequence of scan are as shown each probe comprising an "A" pulse followed by a "B" pulse positioned according to the ROM 66 program. For aircraft below 10,000 feet the probes on lines b-k would be followed, while for aircraft above 10,000 feet lines l through q would be followed. A scan is sequenced by altitude layer probing and tracking of all aircraft contained in the altitude layers of interest, depending on flight path (level, climbing, descending). See FIGS. 7 and 8 for a typical sequence pattern.

The sequencing of the modulo-5 counter steps the system through the address zones being interrogated by changing the pulse pair codes out of the look/up table ROM 66.

If the rate of altitude change is greater than or equal to a predetermined reference signal (input B) from rate reference 61, then the up/down counter is incremented (input A) by one count if the altitude is increasing, or decremented by one count if the altitude is decreasing. In the preferred form of the output as implemented for the SECANT system described above, the reference rate 61 is set for a rate of 1,200 feet per minute. The purpose of incrementing or decrementing is to bias the altitude "addresses" in the direction in which the altitude of the aircraft in its interrogating mode is changing. If the rate of altitude change is less than the predetermined reference 61, then the counter 54 will remain static and not count in either direction retaining thereby the altitude reading of the altimeter 50.

Comparator 58 provides a carry-in control to counter 54 to adjust the actual altitude reading from altimeter 50a according to the rate of climb or descent exceeding the preset reference. This adjusted altitude as loaded into counter 54 is used as part of the address for the look-up table in ROM 66. Modulo-5 counter 70 provides the remainder of the address to ROM 66 for controlling the data which is read-out from ROM 66 as this part of the address cycles through its possible states. Repetitively, based on the five binary addresses, the ROM 66 provides the data word representing the number of two microsecond pairs representing the zones of altitude which are to be interrogated in each scan.

The output of ROM 66 is a binary word (N) representing the number of 2-microsecond intervals which are added to the minimum interval of 34-microseconds to define thereby the total interval between the two pulses A and B, (FIG. 5) of the probe.

Figure 5:
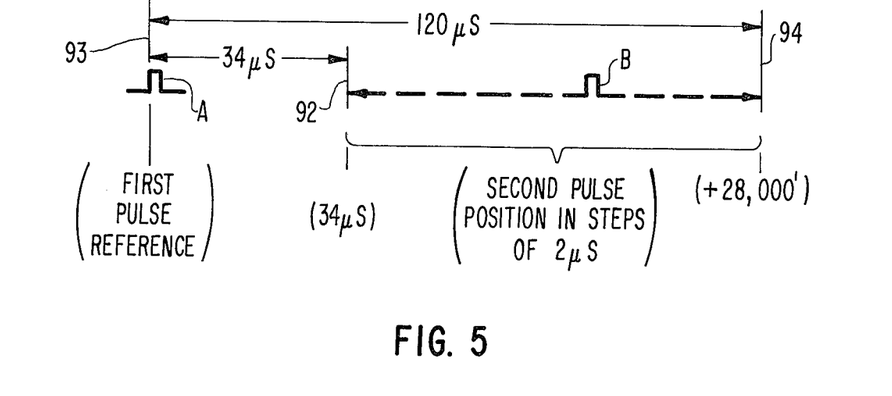
FIG. 5 is a timing diagram illustrating the intervals between the pair of pulses used for coding and decoding the altitude information according to the invention.

Reference is made to FIG. 5 showing a single specimen of a pulse pair (A and B) and the range of various spacings between those pulses that are provided in accordance with the present embodiment. The first pulse A is transmitted in accordance with the interrogation probe patterns described in detail in the above-identified copending application and patents. In the SECANT system, in general, pulse A is an RF pulse of a frequency determined by the P or Q probe of the interrogator aircraft and whether it is transmitted from the upper (16 - FIG. 1) or lower (18) antenna. The responding aircraft receiving a pulse A replies to it and retransmits a signal of a frequency corresponding to the P or Q character received. The transponding (interrogator) aircraft upon the receipt of a plurality of such replies from one or more aircraft, by correlation techniques, described in said above patent applications, determines which of such replies identifies threatening aircraft as a candidate for potential collision.

In accordance with the present invention, in addition to such an interrogation pulse A, a second pulse B, is transmitted a predetermined interval later depending on the altitude and change in altitude of the aircraft for addressing probes, so that only the aircraft in the specified altitude layer will respond thereby reducing the number of signals that must be processed in high traffic density.

As shown in FIG. 5, pulse A is delayed initially a precise amount, namely, 34 microseconds as indicated by the delay interval between references 93 and 92. Any other interval between the probe pulse A transmitting time 93 and the interval 92 may be used depending on multipath conditions. As discussed above, the interval of 34 microseconds has been determined by tests and calculations in consideration of multipath problems between the transmitting aircraft, ground reflections, and other aircraft to avoid the possibility of a pair of pulses being improperly decoded. The interval between the end of the first predetermined fixed interval 92 and the maximum interval 94 of 120 microseconds determines the length of shift registers 74 (FIG. 3) and 75 (FIG. 4). The first interval for the transmission of the B pulse occurs at time reference 92, which corresponds to a 500-feet or 1,000-feet altitude layer address.

According to the system being described, means are provided to establish two-microsecond spacings for each 500-feet increment of the altitude layer address for aircraft flying below 10,000-feet and for each 1,000-foot increment in altitude for aircraft flying above 10,000 feet. For all aircraft flying above 30,000 feet, a fixed spacing of 120 microseconds is used. This single universal code interrogates all aircraft above that high altitude. Thus, it will be seen from an inspection of FIG. 5 that 44 incremental values are provided between reference interval 92 and reference interval 94 of 2-microseconds difference to provide 44 discrete altitude layers for address purposes. Pulse A is transmitted approximately once every millisecond in accordance with the signalling principle of the SECANT system described in the above-identified patents and applications, pulse A being a "start" pulse indication for the replying aircraft to process in its transponder and the B pulse defining the altitude band to be interrogated. The pair of pulses A and B are transmitted either over antenna 16 or 18 as shown in FIG. 1 once every millisecond the spacing between each of pulse pair A and B being determined by the reading of altimeter 50 and a altitude layer scan program as preset in ROM 66 of the transmitting or integrating aircraft.

The incoming probes or interrogations represented by the pulse pairs A and B are received by a receiving aircraft over its corresponding upper antenna 32 and lower antenna 30 as illustrated in FIGS. 2 and 4 and passed through receivers 38a and 38b to the synchronization logic 82 and AND gate J of the decoders 42 and 44. The logic circuit 82 provides output signal pulse 85 for each of pulses A and B which signal pulses have leading edges corresponding to the leading edges of the incoming pulses A and B. Pulses 85 are made of substantially uniform width (between N and N + 1 clock periods, usually 2 - 3 microseconds.) In addition, logic circuit 82 synchronizes the trailing edge of pulses A and B to the clock 90 of the receiving aircraft for use in the receiving variable length shift register 75. As indicated previously, any suitable logic circuit will serve to provide the synchronization functions required for synchronization logic block 82 of FIG. 4. Such logic may be formed with an array of flip-flops arranged as indicated in FIG. 6. Thus, N flip-flops 93 such as the known D-type flip-flops are arranged such that the first or lowest order of the flip-flops is clocked or started by the input pulses A and B over conductors 84a (top) or 84b (bottom) from its associated receiver 38a or 38b. Each subsequence flip-flop 93a, 93b, . . . 93n is under control of the system clock 90b receiving the clock pulses over the C bus to the C or clock input of each flip-flop. In addition, the Q output of each of the flip-flops 93 except the last (93n) is coupled to the D input of the subsequent flip-flop, the last flip-flop having its Q output provide the synchronizing pulses to shift register 75 over conductor 85a. As shown, the Q output of the last flip-flop 93n is coupled back to the reset (R) input of the first flip-flop 93 over conductor 94. In operation, in response to the input pulses A or B the logic circuit 82 provides a synchronize pulse which is equal to or greater than N, but less than N + 1 clock periods wide, which, as previously explained, defines the "window" during which the decoder in the responding aircraft is enabled to reply.

Both pulses of the probe pulse pair A and B are processed through shift register 75 the delay for both of which is determined by the barometric altitude of the receiving aircraft as indicated by its altimeter 50b. Shift register 75 is arranged to shift the pulses in steps of 2 microseconds each as previously explained, each 2-microseconds interval representing either 500 feet of 1,000 feet discussed above. The output of the shift register 75, at terminal 75b, provides an enabling window or pulse 75c, 2 microseconds wide, for gating the AND gate 86 so that the second pulse of the probe pulse pair is passed to the reply circuitry 46 (FIG. 2) for channel selection for the proper frequency of the reply signals (P, Q).

The reply circuits 46 function to generate the appropriate P or Q frequency for transmission, through transmitter 48, a single reply pulse in the manner of the SECANT reply signalling principle described in the earlier patents and copending applications. The modifications of that system, it should be understood, in accordance with the principle of the present invention, is that a reply pulse is transmitted only if the addressed probe pulses A and B define the altitude of the reply aircraft. If the address altitude is not that of the replying aircraft, no reply pulse will be transmitted.

Figure 7:
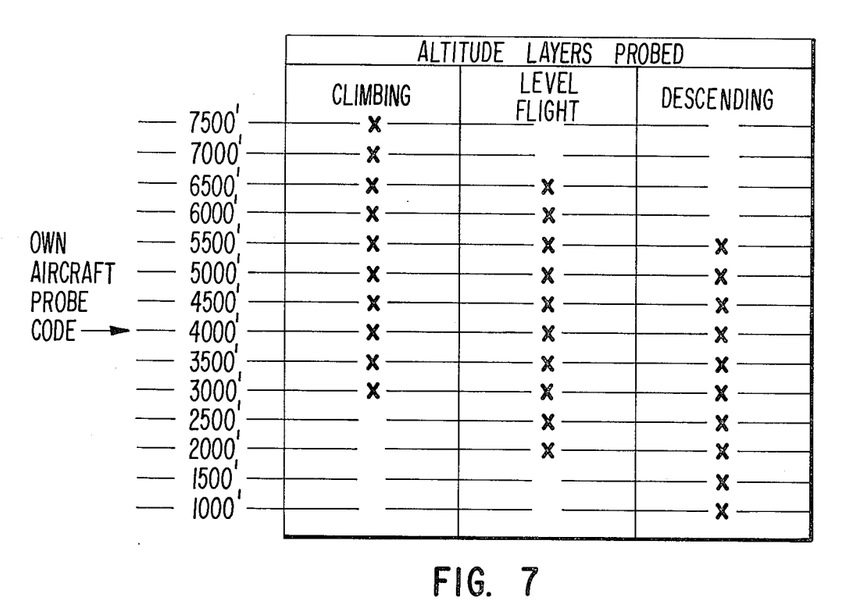
FIGS. 7 and 8 are charts illustrating the altitude layers and the manner in which the altitude information is used for scanning the environment for potential threats of cooperating aircraft.

To indicate the manner in which altitude layers are scanned, reference is made to FIGS. 7 and 8. FIG. 7, shows three modes of scans in ten 500-foot altitude layers. When climbing or descending at greater than 1,200-feet per minute, the layers being scanned are shifted in the direction of the vertical motion by two altitude layers (1,000 feet).

Above 10,000 feet of altitude, six 1,000 foot layers are scanned as shown in FIG. 8. For an aircraft climbing or descending at a rate greater than 1,200 feet per minute, the layers being scanned are either not altered or shifted in the direction of the vertical motion by two altitude layers (2,000 feet) depending on whether the altitude of the aircraft in thousands of feet is an odd or even number. The shift is suitably restricted to even numbered 1,000 feet altitudes. Thus, there is an upward shift of 2,000 feet for a climbing aircraft, if it is an upper (odd-numbered) half of the 2,000 feet zone between even numbered 1,000 feet altitudes and no shift if it is in the lower (even-numbered) half. Similarly, there is a downward shift of 2,000 feet for a descending aircraft if it is in the lower (even numbered) half of the 2,000 feet zone and no shift if it is in the upper (odd numbered) half.

OVERALL SYSTEM OPERATION

Assuming an aircraft in flight at a barometric altitude less than 10,000 feet, provided with a SECANT transponder and altitude coder according to the invention, a pair of interrogation signals (probes) of a P or Q character are transmitted approximately once every millisecond from either the upper (16) or lower (18) antenna of the aircraft. The probe selector 26 determines on a random basis whether the probe is a P or Q. Switch 12 includes means (not shown) for transferring the probe signals from the upper to lower antenna in accordance with the layers being probed. The encoder 28 (FIG. 3) establishes the spacing between the pulse pair A and B in accordance with the program of ROM 66, whose address includes the altitude of the probing aircraft and the modulo-5 scan sequence so that the various layers are probed for aircraft in the sequence shown in the tables of FIGS. 7 and 8. Ten scans in sequence are made for the 10 altitude bands as illustrated in FIG. 7. It should be understood that the program of scanning is based on a modification of the altimeter output as a function of the altitude changes that, if any, are signalled over path 56 as previously explained (FIG. 3). The spacing is generated by each single pulse from the probe selector 26 being transmitted without delay through OR gate 76 and thence to the transmitter 10, as the A pulse. The same probe pulse is delayed through shift register 74, having both a first fixed delay of 34 microseconds added to a variable delay in 2 microsecond steps determined by the output of ROM 66.

Aircraft in the vicinity within range as much as 50 miles from an interrogating aircraft will receive probe signals comprising pulse pair A and B at signal levels proportional to the range between each respective aircraft. The signals are detected by either the upper (32) or lower (30) antennae through the receiver and associated filters (not shown) to be either an upper or low antenna signal and either a P or Q. The decoder 42 or 44 will receive the pulses A and B in sequence. Pulse A will not be passed through AND gate 86 and is prevented from activating the reply circuitry 46.

B pulse is thereafter received and passed to reply circuitry 46 if the spacing matches the delay of the decoder over the appropriate path 88 (FIG. 2). In the meantime, pulse A is passed through synchronization logic 82 (FIGS. 4 and 6) to generate a synchronized pulse at output path 85a as an input to shift register 75. The sync pulse will be N clock periods wide to provide a "WINDOW" gate pulse for the shift register. The shift register 75 is controlled by altimeter 50b to delay the sync pulse by an amount equal to two-microsecond steps according to the barometric altitude of the receiving aircraft. The A pulse is then passed to AND gate 86 and only if the following B pulse is in synchronism with it indicating thereby a match or coincidence of the altitude of the receiver aircraft with the probing aircraft's addressed altitude layer will the B pulse be passed through. If a B pulse is not in coincidence with the processed A pulse, the (FIG. 9c) receiving aircraft will not respond. However, if there is coincidence, the receiving aircraft is thereby in the altitude band addressed by the probe which requires thereby a single reply signal to be transmitted back to the probing aircraft. This is accomplished as previously described by the reply selection circuit 46, generating a reply signal encoded in accordance with the frequency assigned for the reply.

The interrogation aircraft then receives such replies in a manner more fully described in the above-identified patents and applications to correlate the replies and identify aircraft of potential threat. Such signals of potential threat are passed to the trackers 24 for subsequent tracking.

The scan cycle of transmitting and seeking replies is continually repeated in sequence such that the entire field above, below, and co-level is scanned. Threatening aircraft are identified by coded signals using the P and Q reply signals in a manner described in said patents.

It should now be appreciated that in accordance with the present invention, a system is provided with an altitude discriminant for use in an air traffic control system or collision avoidance system utilizing interrogating responding techniques wherein a pair of probe pulses that are pulse position modulated provides an altitude address between cooperative aircraft. The address defines co-altitude as well as altitude differences between the interrogator and responder aircraft in 500 or 1,000 feet increments. In the preferred form of the invention, the pulse pairs are spaced a minimum of 34 microseconds to avoid multipath problems for use in airborne equipment with additional spacings in 2-microsecond steps each for each additional 500 foot interval of altitude difference of the address up to 10,000 feet of flight levels and 1,000 foot intervals for altitudes above 10,000 feet.

It will be appreciated and understood that the invention as used in an air traffic control system may be arranged such that the interrogating pulse pair encoder is situated in a ground station. Probes of the altitude address are transmitted to remote airborne aircraft to seek replies only from aircraft flying at predetermined altitudes or within predetermined altitude bands. The airborne aircraft receiving the altitude probe addressed only to its altitude will reply with an appropriate reply or other identification signals in accordance with the air traffic control signalling system in use.

What is claimed is:

1. An encoder for use at an interrogator station to provide an altitude address for transmission to a remote aircraft for reply thereto by the aircraft if the altitude of the remote aircraft corresponds to the address, comprising in combination;
   a. means for generating a pair of pulses having spacing between each pulse of said pair of pulses corresponding to a particular altitude address,
   b. means for periodically changing the spacing between said pair of pulses in accordance with a predetermined program to provide a scan of altitudes of predetermined bands, said pulse pair generating means including means for providing said spacing between said pulses in accordance with discrete changes in altitude of said interrogator station that occur during periods of transmission of said pulses, said discrete changes having a value greater than a predetermined value whereby said pulse pair spacing changes in discrete increments only with altitude changes exceeding said predetermined value.

2. An encoder according to claim 1 including a digital read-out altimeter and means for computing the rate of change of altitude in response to the digital data output of said altimeter.

3. An encoder according to claim 2 including a memory device and a modulo-m counter wherein said program is provided by said memory device, the address of said memory device being determined by data corresponding to the output of said digital altimeter and said modulo-m counter.

4. An encoder according to claim 3 further including a variable output digital delay device wherein said memory device provides output control signals to vary the delay of said device in accordance with the program of said memory, said pulse pair generating means including said delay device arranged to receive and delay a probe signal an interval according to said program, said pulse pair generating means including means to transmit said probe signal as said first pulse of said pair of pulses and subsequently transmit said delayed probe signal as said second signal of said pair of pulses manifesting thereby said altitude address.

5. A collision avoidance system for use with interrogator and responder aircraft wherein an altitude discriminant is provided in accordance with a predetermined altitude scan schedule comprising in combination:

means on an interrogator aircraft for transmitting in accordance with a predetermined schedule of addressed altitudes a pair of probe pulses spaced in accordance with a fixed interval and a variable interval depending upon the barometric altitude of the interrogating aircraft, said pulse pair transmitting means including means for providing said spacing between said pulses in accordance with discrete changes in altitude of said interrogator aircraft that occur during periods of transmission of said pulses, said discrete altitude changes having a value greater than a predetermined value whereby said pulse pair spacing changes in discrete increments only with altitude changes exceeding said predetermined value, means on responder aircraft for receiving said pair of probe pulses, said receiving means including means for delaying said first received pulse of said pair of probe pulses an interval proportionate to the barometric altitude of the replying aircraft, and further means on said responding aircraft for transmitting a reply signal only if the second received pulse of said pair of probe pulses is received at a time substantially corresponding to the end of said delay of said first received pulse.

6. A system according to claim 5 including a digital read-out altimeter on said interrogator aircraft and means for computing a rate of change of altitude of said interrogator aircraft in response to the digital data output of said altimeter.

7. An encoder according to claim 6 including on said interrogator aircraft a memory device and modulo-m counter wherein said program is provided by said memory device responsive to an input control address, the input control address of said memory device being determined by control signals corresponding to the output of said digital altimeter and said modulo-5 counter.

8. An encoder according to claim 7 wherein said pair of pulses are spaced in accordance with the output of a variable delay line on said interrogator aircraft, said delay line being responsive to signals representing a memory storing a predetermined program of fixed discrete steps of intervals, each interval representing said predetermined increments of altitude for encoding said address.

* * * * *